United States Patent
Husted

Patent Number: 6,033,015
Date of Patent: Mar. 7, 2000

[54] ARMREST COVER POSITIONING MECHANISM

[75] Inventor: Daniel W. Husted, Saline, Mich.

[73] Assignee: Lear Corporation, Southfield, Mich.

[21] Appl. No.: 08/673,921

[22] Filed: Jul. 1, 1996

[51] Int. Cl.[7] .................................................. A47C 7/62
[52] U.S. Cl. ..................... 297/188.19; 220/335; 16/307; 16/330
[58] Field of Search ................................. 220/335, 343; 297/188.19, 188.1, 188.14; 16/307, 319, 328, 329, 330

[56] References Cited

U.S. PATENT DOCUMENTS

| | | |
|---|---|---|
| 623,367 | 4/1899 | Hanington . |
| 3,104,131 | 9/1963 | Krone . |
| 3,165,225 | 1/1965 | Reitzel ................................ 220/343 X |
| 3,166,080 | 1/1965 | Neale .................................. 220/335 X |
| 3,177,033 | 4/1965 | Daniels . |
| 3,909,063 | 9/1975 | Bonisch et al. . |
| 3,951,448 | 4/1976 | Hawie . |
| 4,193,164 | 3/1980 | Okayama ............................ 16/307 X |
| 4,458,379 | 7/1984 | Shelton ............................... 220/335 X |
| 4,549,832 | 10/1985 | Sterl . |
| 4,785,500 | 11/1988 | Langridge . |
| 4,818,017 | 4/1989 | Dykstra et al. . |
| 4,848,840 | 7/1989 | Toya . |
| 4,882,807 | 11/1989 | Frye et al. . |
| 4,906,044 | 3/1990 | Wilstermann . |
| 5,076,641 | 12/1991 | Lindberg . |
| 5,109,571 | 5/1992 | Ohshima et al. ..................... 16/307 |
| 5,116,099 | 5/1992 | Kwasnik et al. . |
| 5,131,716 | 7/1992 | Kwasnik et al. ................ 297/188.19 X |
| 5,342,115 | 8/1994 | De Filippo . |
| 5,408,726 | 4/1995 | Kent ...................................... 16/330 X |
| 5,509,529 | 4/1996 | Kelley ................................. 220/335 X |

*Primary Examiner*—Peter M. Cuomo
*Assistant Examiner*—Stephen Vu
*Attorney, Agent, or Firm*—MacMillan, Sobanski & Todd, LLC

[57] ABSTRACT

An armrest assembly comprising a bin defining a storage compartment and a cover hinged to the bin for movement between open and closed positions. A shaft rotatably supports the cover on the bin for pivotal movement of the cover relative to the bin. A helical torsion spring is coiled about the shaft and has one end reacting with the bin and the other end reacting with the cover for continuously urging the cover to the open position. A detent, having at least one caming surface, is disposed on the shaft for engaging the bin and is rotatable with the cover for retaining the cover in at least one detent position. The detent is located between the bin and the spring. Accordingly, the spring continuously biases the detent axially against the bin and also continuously biases the cover to the open position.

22 Claims, 3 Drawing Sheets

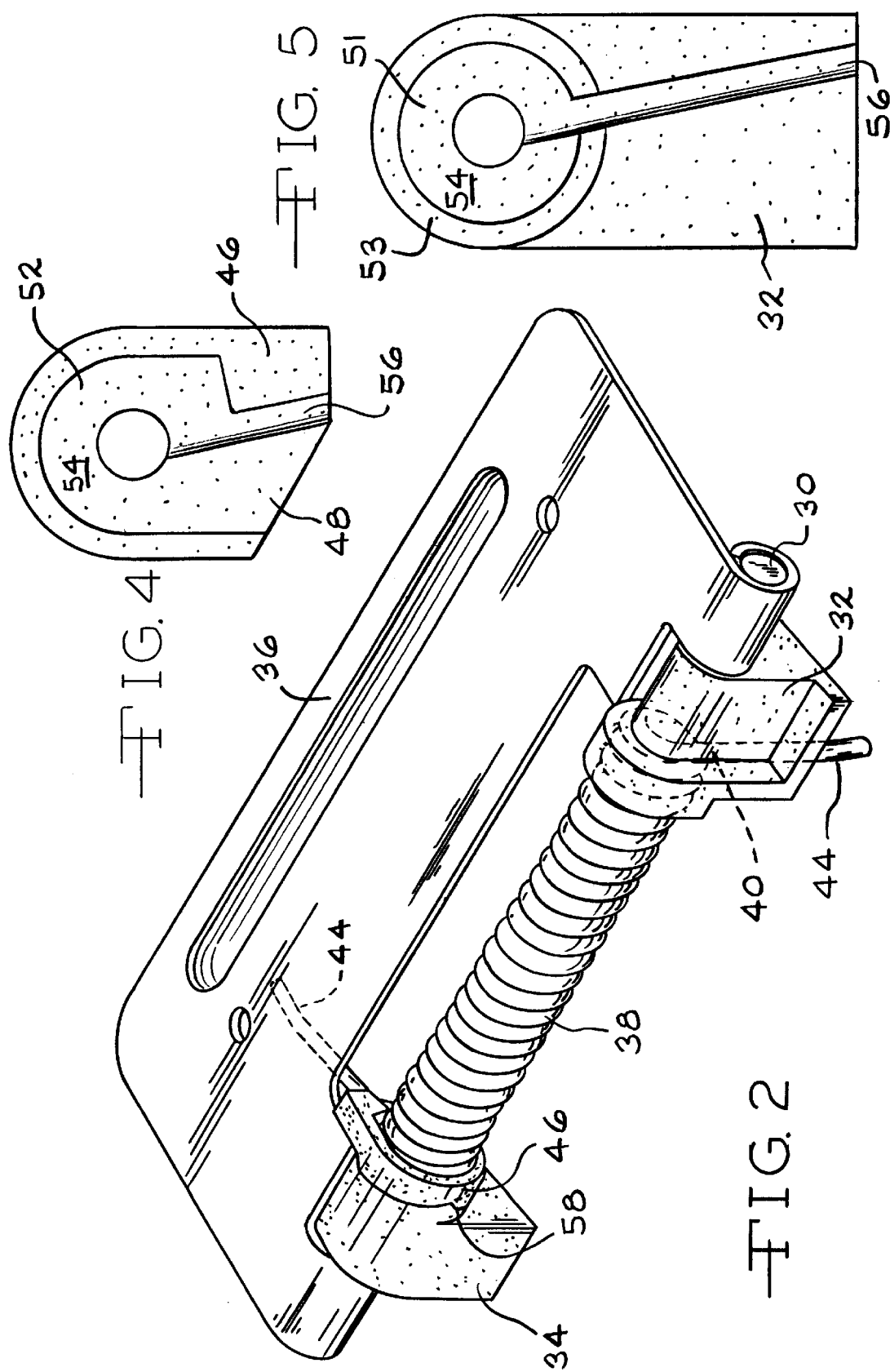

US 6,033,015

ARMREST COVER POSITIONING MECHANISM

TECHNICAL FIELD

The subject invention relates generally to a vehicle armrest assembly, and more specifically, to an armrest assembly having a spring biased cover and a coacting detent which maintains the cover in a desired position.

BACKGROUND OF THE INVENTION

Vehicles having an armrest assembly mounted to a seat assembly to provide a comfortable forearm rest for a driver and/or a passenger are well known in the art. These armrest assemblies typically pivot between a horizontal use position and a vertical storage position. Often, the armrest assembly comprises a bin defining a storage compartment and a cover hinged to the bin for covering the bin in a closed position and opening the storage compartment in an open position. The cover is hinged to the bin by a rotatable shaft mounted within or above the bin. Cupholders, writing pads, and portable phone mounts may be mounted within the storage compartment for use when the cover is opened. The storage compartment is also used for storing articles such as cassette tapes, compact discs, coins, and the like.

A latch is typically provided between the cover and the bin to maintain the cover in a latched position when the armrest is pivoted to the vertical storage position. This latch ensures that cover will not open and that the contents in the storage compartment will not fall out when the armrest is pivoted upwardly.

In certain armrest applications it is desirable to have a torsion spring coiled about the shaft for biasing the cover into the open position. The spring assists a user in opening the cover to the armrest and also assists in maintaining the cover in the open position. As can be appreciated it is important to maintain the cover in the open position when utilizing a device that is located within the bin, i.e., a writing pad, cupholder, portable phone mount or the like. These prior art spring biased covers, however, do not provide a detent with a positive locking position for the cover which maintains the cover in a desired position throughout sudden decelerations and similar driving conditions.

SUMMARY OF THE INVENTION AND ADVANTAGES

The subject invention relates to a vehicle seat armrest assembly comprising a bin and a cover for covering the bin. A shaft rotatably supports the cover on the bin for pivotal movement of the cover relative to the bin between a closed position and an open position. A torsion spring is coiled about the shaft with a first end reacting with the bin and a second end reacting with the cover for urging the cover to the open position in response to winding of the spring. A detent is disposed on the shaft for engaging the bin and is rotatable with the cover for retaining the cover in at least one detent position whereby the spring biases the detent axially against the bin.

Accordingly, this armrest assembly provides a compact concealable detent mechanism located on a rotatable shaft which maintains an armrest cover in a desired position by a spring which continuously biases an armrest cover upwardly and also continuously biases the detent toward an armrest bin for continuous engagement of the detent with the bin.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a perspective view of the subject invention;

FIG. 4 is an enlarged side view of the detent of FIG. 2;

FIG. 5 is an enlarged side view of the spring bracket of FIG. 2;

DETAILED DESCRIPTION OF THE PREFERRED EMBODIMENT

Figure 1:
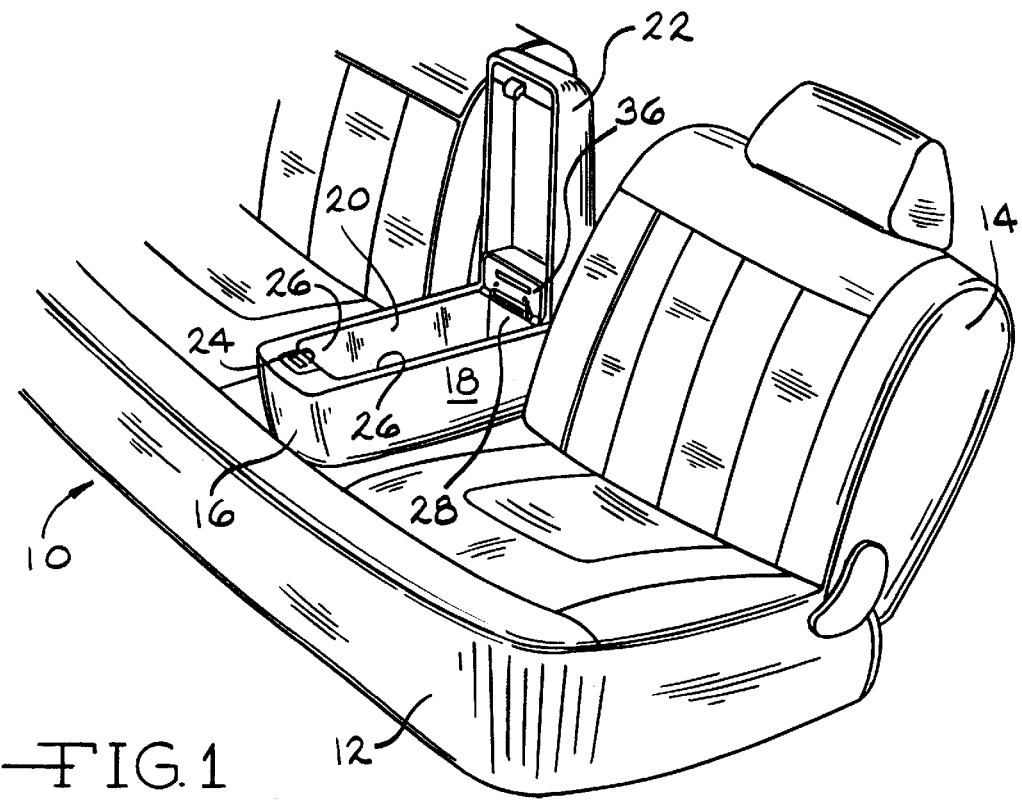
FIG. 1 is a perspective view of an armrest assembly disposed within a vehicle seat assembly.

Referring to the Figures, wherein like numerals indicate like or corresponding parts throughout the several views, a vehicle seat assembly is generally indicated at 10 in FIG. 1. The seat assembly 10 includes a generally horizontal seat bottom portion 12 and a generally vertical seat back portion 14. An armrest assembly 16 is pivotally mounted within the seat back portion 14 and pivotal between a generally horizontal use position parallel with the seat bottom portion 12 and a vertical storage position generally parallel to the seat back portion 14. The armrest assembly 16 is mounted to the seat back portion 14 by a bracket assembly (not shown) which provides rotation of the armrest assembly 16 between the horizontal use position and the vertical storage position.

The armrest assembly 16 is molded of plastic material and may be covered with a padded foam, plastic, or trim as commonly known in the art. The armrest assembly 16 comprises a bin 18 defining a storage compartment 20 and a cover 22 hinged to the bin 18 for covering the bin 18 in a closed position and opening the storage compartment 20 in an open position (as shown). More specifically, the bin 18 comprises a front wall 24, side walls 26, a back wall 28, and a bottom (not shown) which further define the shape of the storage compartment 20. Interior spaces or cavities (not shown) may be located within the storage compartment 20 for retaining any number of articles (not shown), i.e., cassette tapes, compact discs, coins and the like. Further, cupholders, writing pads, and portable phone mounts (not shown) may be provided within the storage compartment 20 for selective use by a user within or outside the bin 18.

Referring also to FIG. 2, a shaft 30 rotatably supports the cover 22 on the bin 18 for pivotal movement of the cover 22 relative to the bin 18 between the closed position and the open position. Specifically, the shaft 30 is supported by a pair of brackets 32, 34 that rise upwardly from the backwall 28 of the bin 18. The pair of brackets 32, 34 comprises a spring bracket 32 and a detent bracket 34. The shaft 30 extends through the brackets 32, 34, whereby the distal ends of the shaft 30 extend outwardly from the brackets 32, 34. A flat metal plate 36 is mounted to an inside surface of the cover 22 and pivotally engages the distal ends of the shaft 30. Hence, the cover 22 pivots freely along the shaft 30 and the shaft 30 pivots within the spring 32 and detent 34 brackets.

A helical torsion spring 38 is coiled about the shaft 30 between the spring 32 and detent 34 brackets, whereby the spring 38 is in constant engagement with the brackets 32, 34. Hence, regardless of the cover's 22 position the spring 38 is continuously biasing outwardly against the spring 32 and detent 34 brackets. A first end 40 of the spring 38 reacts with the bin 18 and a second end 42 of the spring 38 reacts with the cover 22 for urging the cover 22 to the open position in response to winding of the spring 38. Both the first 40 and second 42 ends of the spring 38 have an arm 44 extending radially therefrom. Accordingly, the arm 44 of the first end 40 of the spring 38 rests against the spring bracket 32 extending from the bin 18. As best shown in FIG. 5, a first abutment 51 is disposed within the interior face of the spring bracket 32. The abutment 51 comprises a circular exterior wall 53 which surrounds a sloping inner surface 54, whereby the sloping inner surface 54 extends helically downward into a groove 56. The spring 38 is disposed within the sloping inner surface 54 and the arm 44 of the first end 40 engages the groove 56 of the first abutment 51.

The arm 44 of the second end 42 of the spring 38 rests against the inside surface of the metal plate 36. Hence, the spring 38 also continuously biases the cover 22 to the open position. Specifically, when the cover 22 is closed and latched to the bin 18 the spring 38 is wound a half turn tighter around the shaft 30. The spring 38 unwinds a quarter turn when the cover 22 is completely opened. The spring 38 is wound tighter around the shaft 30 because the residual stresses on the spring 38 are reduced if the spring 38 is wound in the same direction as the spring 38 is coiled. As is readily apparent, the spring 38 continuously acts in two directions, axially toward the spring 32 and detent 34 brackets, and rotatably against the spring bracket 32 and the metal plate 36.

A detent 46 is disposed on the shaft 30 for engaging the detent bracket 34 on the bin 18. The detent 46, which includes an interior face 48 and an exterior face 50, is rotatable with the cover 22 for retaining the cover 22 in at least one detent position. A second abutment 52 is disposed within the interior face 48 of the detent 46 for mechanical interlocking engagement with the arm 44 of the second end 42 of the spring 38. Generally, the abutment 52 extends radially from the shaft 30 which provides for easy engagement of the radially extending arm 44 of the spring 38. As best shown in FIG. 4, the second abutment 52 also comprises the sloping inner surface 54 extending helically downward into the groove 56. The spring 38 is disposed within the sloping inner surface 54 and the arm 44 of the second end 42 engages the groove 56 of the second abutment 52. Hence, the spring 38, detent 46, metal plate 36, and cover 22 all rotate from the closed position to the open position as a single unit. As discussed above, the spring 38 continuously biases the detent 46 axially against the detent bracket 34 thereby maintaining the detent 46 in constant engagement with the detent bracket 34.

Figure 3:
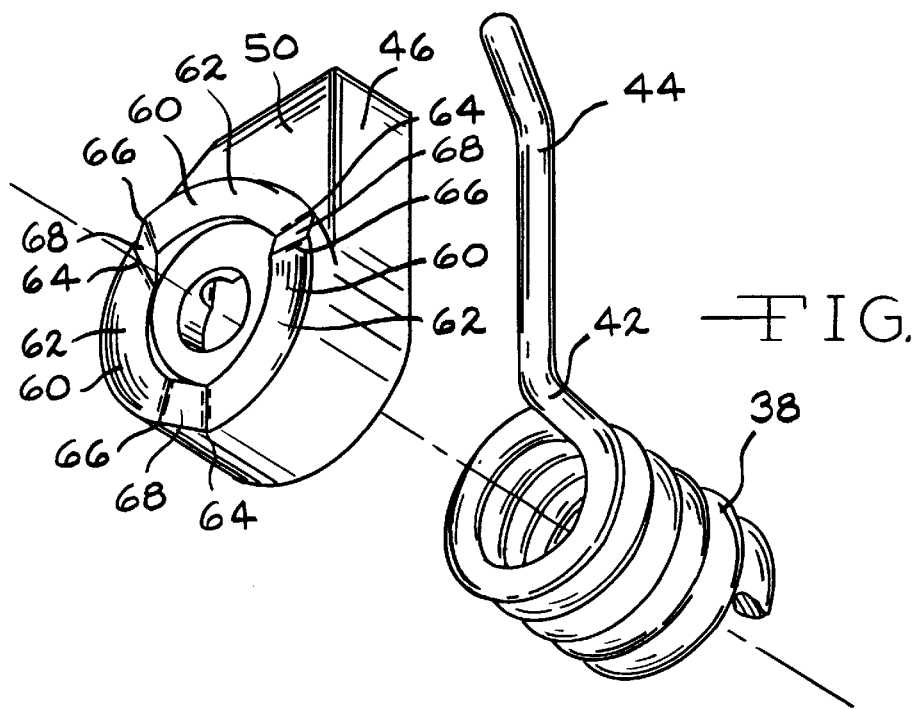
FIG. 3 is an enlarged perspective view of the detent and the torsioned spring of FIG. 2.

The armrest assembly 16 also includes coacting undulations 58 located between the detent 46 and the detent bracket 34 of the bin 18 for affecting axial movement of the detent 46 against the biasing action of the spring 38. Each of the coacting undulations 58 on the detent 46 includes a caming surface 60 which translates rotary motion of the detent 46 into the axial movement of the detent 46 and the spring 38. The detent 46 includes a first plurality of caming surfaces 60 and the detent bracket 34 includes a second plurality of caming surfaces 60 for coacting engagement with the first plurality of the caming surfaces 60 of the detent 46. As best shown in FIG. 3, each of the caming surfaces 60 includes a first ramp 62 extending upwardly from a base 64 to a crest 66. A plurality of these caming surfaces 60 extend circumferentially along the exterior face 50 of the detent 46 and along the corresponding face of the detent bracket 34. Each of the caming surfaces 60 also includes a second ramp 68 extending downwardly from the crest 66 of the first ramp 62. The second ramps 68 abut each of the bases 64 of the first ramps 62 wherein each second ramp 68 and each base 64 of the first ramps 62 define the detent position. In general, the coacting undulations 58 include at least one detent position wherein the cover 22 pivots upwardly relative to the bin 18.

Figure 6:
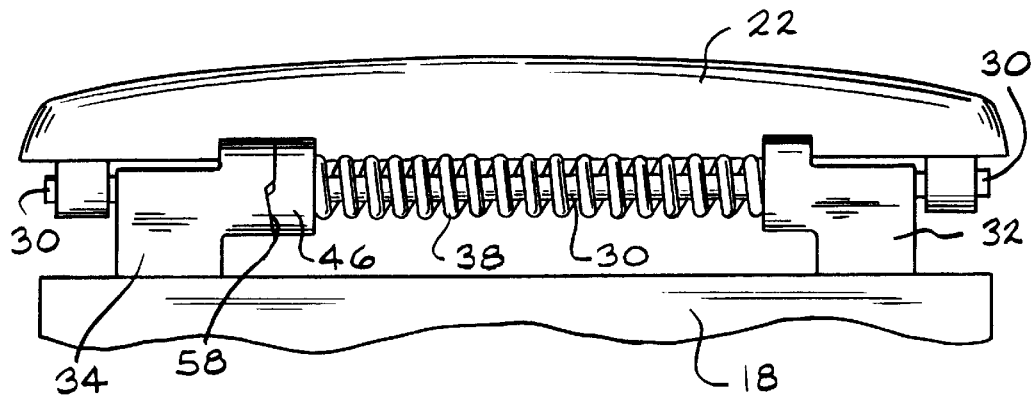
FIG. 6 is a rear view of the armrest assembly in a closed position.
Figure 7:
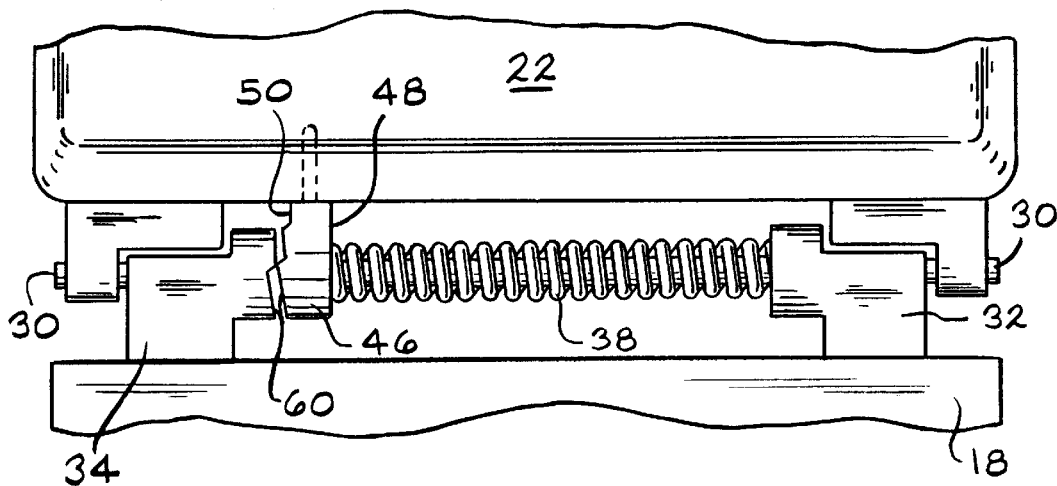
FIG. 7 is a rear view of the armrest assembly in a partially opened position.
Figure 8:
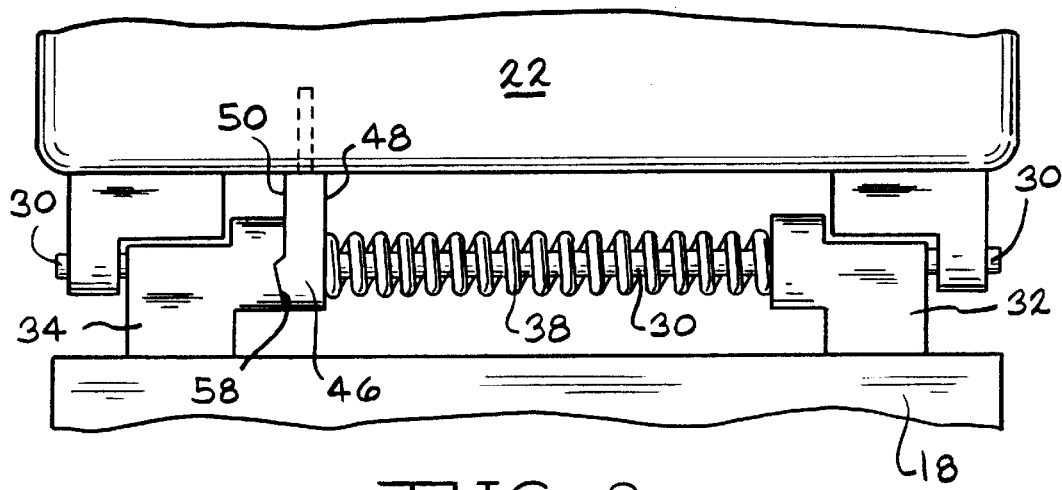
FIG. 8 is a rear view of the armrest assembly in a fully opened position.

FIGS. 6, 7, and 8 illustrate the operation of the cover 22 from a closed position covering the bin 18 to an open position raised above the bin 18. In FIG. 6 the cover 22 is closed and latched to the bin 18. The spring 38 biases the detent 46 toward the detent bracket 34 which engages the caming surfaces 60 of the detent 46 with the caming surfaces 60 of the detent bracket 34. Specifically, the crests 66 of the caming surfaces 60 of the detent 46 are partially spaced from the bases 64 of the caming surfaces 60 of the detent bracket 34 and similarly the crests 66 of the caming surfaces 60 of the detent bracket 34 are partially spaced from the bases 64 of the caming surfaces 60 of the detent 46. In other words, the crests 66 of the caming surfaces 60 of the detent 46 are engaging the first ramps 62 of the detent bracket 34 and similarly the crests 66 of the caming surfaces 60 of the detent bracket 34 are engaging the first ramps 62 of the detent 46. As the cover 22 opens, the crests 66 move circumferentially along the first ramps 62 and the detent 46 is pushed axially away from the detent bracket 34 which in turn compresses the spring 38. This movement of the detent 46 and the compression of the spring 38 continues until the crests 66 of the detent 46 meet the crests 66 of the detent bracket 34 (as shown in FIG. 7). The spring 38 then quickly pushes the detent 46 toward the detent bracket 34 whereby the crests 66 of both the detent 46 and the detent bracket 34 slide down their corresponding second ramp 68 to a corresponding base 64. As shown in FIG. 8, the detent 46 positively locks the cover 22 into the fully open position whereby the crests 66 of the caming surfaces 60 of the detent 46 engage the bases 64 of the caming surfaces 60 of the detent bracket 34 and similarly the crests 66 of the caming surfaces 60 of the detent bracket 34 engage the bases 64 of the caming surfaces 60 of the detent 46.

To close the cover 22, a user simply pushes the cover 22 downwardly toward the bin 18 with sufficient force to overcome the biasing force of the spring 38 and the frictional forces between the caming surfaces 60 of the detent 46 and the caming surfaces 60 of the detent bracket 34. As is apparent to one skilled in the art, the detent 46 and detent bracket 34 may have numerous caming surfaces 60 to provide any number of positive stops for the cover 22. Further, the caming surfaces 60 of the detent 46 and the detent bracket 34 may be of different configurations without deviating from the scope of the subject invention.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A vehicle seat assembly having an armrest assembly comprising;

a bin, a cover for covering said bin, a shaft rotatably supporting said cover on said bin for pivotal movement of said cover relative to said bin between a closed position and an open position, a torsion spring coiled about said shaft, said spring having a first end reacting with said bin and a second end reacting with said cover for urging said cover to said open position in response to winding of said spring about said shaft, a detent disposed on said shaft for engaging said bin and rotatable about said shaft with said cover for retaining said cover in at least one detent position, and said spring biasing said detent axially against said bin.

2. An assembly as set forth in claim 1 wherein said detent includes a second abutment for mechanical interlocking engagement with said spring whereby said detent rotates with said spring.

3. An assembly as set forth in claim 2 wherein said second end of said spring includes an arm extending laterally and engaging said second abutment.

4. An assembly as set forth in claim 3 wherein said arm extends radially from said spring and said second abutment extends radially of said shaft.

5. An assembly as set forth in claim 4 wherein said second abutment comprises a groove disposed in said detent.

6. An assembly as set forth in claim 5 wherein said second abutment comprises a sloping inner surface extending helically downward into said groove.

7. An assembly as set forth in claim 2 including coacting undulations between said detent and said bin for effecting axial movement of said detent against the biasing action of said spring.

8. An assembly as set forth in claim 7 wherein each of said coacting undulations on said detent includes a caming surface which translates rotary motion of said detent into said axial movement.

9. An assembly as set forth in claim 8 wherein each of said caming surfaces includes a first ramp extending upwardly from a base to a crest.

10. An assembly as set forth in claim 9 wherein a plurality of caming surfaces extend circumferentially along an exterior face of said detent.

11. An assembly as set forth in claim 9 wherein each of said caming surfaces includes a second ramp extending downwardly from said crest of said first ramp.

12. An assembly as set forth in claim 11 including a spring bracket and a detent bracket extending from said bin.

13. An assembly as set forth in claim 12 wherein said shaft is rotatably supported by said brackets and extends outwardly through said brackets.

14. An assembly as set forth in claim 13 including a flat metal plate mounted to said cover and rotatably supported by said shaft.

15. An assembly as set forth in claim 13 wherein said detent and said spring are disposed along said shaft between said brackets.

16. An assembly as set forth in claim 15 wherein said detent includes a first plurality of caming surfaces and said detent bracket includes a second plurality of caming surfaces for coacting engagement with said first plurality of said caming surfaces of said detent.

17. An assembly as set forth in claim 15 wherein said spring bracket includes a first abutment for mechanical interlocking engagement with said spring.

18. An assembly as set forth in claim 17 wherein said first end of said spring includes an arm extending laterally and engaging said first abutment.

19. An assembly as set forth in claim 18 wherein said first abutment comprises a sloping inner surface extending helically downward into a groove.

20. An assembly as set forth in claim 11 wherein each of said second ramps abut each of said bases of said first ramps.

21. An assembly as set forth in claim 20 wherein said second ramp and said base of said first ramp define said detent position.

22. An assembly as set forth in claim 21 wherein said coacting undulations include at least one open detent position wherein said cover pivots upwardly relative to said bin.

* * * * *